Patented Nov. 12, 1935

2,020,385

UNITED STATES PATENT OFFICE 2,020,385

CHEMICAL PRODUCTS

William Todd, Manchester, England, assignor to Imperial Chemical Industries Limited, a corporation of Great Britain No Drawing. Application November 10, 1932, Serial No. 642,125. In Great Britain November 25, 1931

9 Claims. (Cl. 252—1)

This invention relates to new chemical compositions, more particularly chemical products suitable for use as wetting agents, and a process for the preparation thereof.

In British Patents Nos. 242,233; 246,507; 246,817; 274,611; 279,990 and 311,885 are described various wetting agents obtained by the sulfonation and alkylation of nuclear hydrocarbons or petroleum fractions. As specific examples of the products described in these patents may be mentioned butylated naphthalene sulfonic acid, stearotoluene sulfonic acid, palmitobenzene sulfonic acid, isopropyl naphthalene sulfonic acid, and salts of these compounds. Other wetting agents mentioned are the products obtained by the sulfonation of raw or purified mineral oils and then condensing the resultant product with aliphatic, cyclo-aliphatic or alphyl alcohols in the presence of sulfuric acid, and similar products prepared by variations in the methods of sulfonating and alkylating, for example by varying the order in which the reacting substances are treated with the sulfating or sulfonating agent, or by varying the type of sulfating or sulfonating agent employed.

In general, products of the character above described, as solid substances, are not altogether satisfactory in use. In particular, they dissolve slowly and sometimes incompletely in water and tend to form sticky balls or lumps having a dry core, which are difficult to break up and bring into solution. Further, some of them are not very soluble. These defects render the substances inconvenient to use when the only water available for making solutions is cold water, as in agricultural operations in the field.

It is an object of the present invention to produce new and improved compositions suitable for use as wetting agents which are characterized particularly by the property of being easier to dissolve than sulfonated and alkylated nuclear hydrocarbons or petroleum fractions of the character previously described. Another object is the provision of a new and improved method for producing these compositions. Other objects will appear hereinafter.

These objects are accomplished according to the invention whereby solid compositions of improved properties, especially with regard to increased solubility in water, are obtained by incorporating together a wetting agent resulting from sulfonating and alkylating a nuclear hydrocarbon or a petroleum fraction and a soluble salt of a sulfonic acid of the benzene series.

To the mixture obtained by incorporating together the ingredients as described, a water-soluble inorganic salt also may be added. Water soluble inorganic salts will, in fact, be present of necessity if ingredients of technical quality are used, but in accordance with the invention, it has been found that the results which it is desired to obtain are governed to some extent by the content of water soluble salt in the composition, and if desired, such a salt may be either added or the amount of salt naturally present increased.

While the invention is susceptible of considerable variation and modification in the matter of its practical application, particularly as regards the nature and proportions of the ingredients in the chemical compositions produced and the exact method of operation, the following examples, in which the parts are by weight, will serve to illustrate how the invention may be practiced:

Example I

A sulfonated and alkylated petroleum fraction was prepared by reacting oleum with petroleum oil boiling within the range of 150° C. to 300° C., recovering the sulfonated or sulfated product and reacting said product with isopropyl alcohol and sulfuric acid according to the procedure and proportions employed in Example I of British Patent 311,885. Fifty parts of the resultant product, 40 parts of sodium chloride and 10 parts of sodium benzylaniline sulfonate were well mixed by grinding. The dry powder so obtained dissolved readily and freely in water, there being no tendency to form lumps.

Instead of the sodium benzylaniline sulfonate, potassium ethylaniline-para-sulfonate may be used.

Example II

Approximately 50 parts of a sulfonated and alkylated petroleum fraction such as was used as a starting material in Example I were mixed with 50 parts of sodium benzene disulfonate, both of the ingredients being in powder form. The resultant powder dissolved easily and quickly in cold water without any tendency to form sticky, intractable masses.

Example III

Eighty parts of a butylated beta-naphthalene sulfonic acid sodium salt obtained as described in Example I of British Patent No. 246,817 and 20 parts of sodium benzylaniline sulfonate were mixed together. The composition so obtained dissolved readily and freely in cold water.

*Example IV*

Fifty parts of the sulfonated and alkylated petroleum fraction used as a starting material in Examples I and II were intimately mixed with 25 parts of sodium chloride and 25 parts of sodium benzene monosulfonate, all of the ingredients being in powder form. The resultant product dissolved readily in cold water and, like the compositions of the other examples, possessed excellent wetting properties.

The general procedure described in the examples may be applied in the production of other compositions from ingredients falling within the scope of the invention. The type of sulfonated and alkylated petroleum fraction used as a starting material may vary within relatively wide limits. In general, of the sulfonated and alkylated petroleum fractions, those boiling above about 150° C. and below about 300° C., are preferably employed. Of the sulfonated and alkylated nuclear hydrocarbons, it is preferable to employ the sulfonated polynuclear hydrocarbons as starting materials.

The choice of a soluble salt of a benzene or naphthalene sulfonic acid to be used in accordance with the invention is generally to be made upon economical grounds. As a general rule, it is preferable to use the alkali metal or ammonium salts. As specific examples of salts which may be used may be mentioned: the technically available sodium or potassium salts of benzenesulfonic acid, benzene disulfonic acid, sulfanilic acid benzylaniline sulfonic acid and ethylamine-benzene sulfonic acid. It will be noted that these compounds in themselves are substantially devoid of wetting powers; their effect, therefore, on the properties of the entire composition is indeed surprising. Some differences of degree, but not of kind, in the behaviour of the various salts is noticeable. The salts of the benzene sulfonic acids are particularly effective.

As previously indicated, any water-soluble inorganic salt may be incorporated with the foregoing ingredients. As specific examples of such salts may be mentioned: sodium carbonate, sodium sulfate, sodium chloride, mono-, di- and tri-sodium phosphates, sodium acetate, sodium bicarbonate and similar compounds of the other alkali metals or of ammonium. The incorporation of the ingredients may be performed either wet, as by mixing solutions or pastes; or dry, as by grinding together the ingredients. When the incorporation is carried out in the wet state, the solution or paste may afterwards be dried and ground.

As many apparent and widely different embodiments of this invention may be made without departing from the spirit thereof, it is to be understood that I do not limit myself to the foregoing examples or descriptions except as indicated in the following claims.

I claim:

1. As a new composition of matter the product obtained by incorporating together butylated beta-naphthalene sulfonic acid sodium salt and sodium benzylaniline sulfonate.

2. A composition of improved properties especially with regard to solubility and readiness to dissolve in water, resulting from incorporating together in powder form about 40 parts of sodium chloride, about 10 parts of sodium benzyl aniline sulfonate and about 50 parts of a sulfonated and alkylated petroleum fraction obtainable by reacting oleum with petroleum oil boiling within the range of 150° C. to 300° C. and isopropylating the resultant sulfonated product.

3. A composition of matter comprising a dry mixture of a wetting agent and alkali-metal sulfonate of a compound of the group consisting of benzene, aniline, and N-substituted anilines.

4. A composition of matter comprising a dry mixture of a wetting agent and alkali-metal sulfonate of a compound of the group consisting of benzene, aniline, benzyl-aniline and ethyl-aniline.

5. A composition of matter as in claim 3, the proportion of the alkali metal sulfonate being from 20 to 50% by weight of the whole composition.

6. A composition of matter as defined in claim 3 and containing further a water-soluble inorganic salt of an alkali-metal.

7. A composition of matter as defined in claim 3 and containing further a water-soluble inorganic salt of an alkali-metal, the proportion of alkali-metal sulfonate being from 20 to 50% by weight of the whole composition, and the proportion of the inorganic alkali-metal salt varying from the small percentage generally present in the other ingredients as an impurity to 40% by weight of the entire composition.

8. A composition of matter comprising a dry mixture of a wetting agent of the sulfonated alkylated-naphthalene series, and an alkali-metal sulfonate of a compound of the group consisting of benzene, aniline and N-substituted anilines.

9. A composition of matter comprising a dry mixture of a wetting agent of the sulfonated alkylated-petroleum fraction series, and an alkali-metal sulfonate of a compound of the group consisting of benzene, aniline and N-substituted anilines.

WILLIAM TODD.